United States Patent Office 3,225,055
Patented Dec. 21, 1965

3,225,055
1,5 AND -1,6-NAPHTHYRIDINE-3-CARBOXYLIC ACID-1,4-DIHYDRO 4-OXO AND ESTERS THEREOF
George Yohe Lesher, Schodack, N.Y., assignor to Sterling Drug Inc., New York, N.Y., a corporation of Delaware
No Drawing. Filed Feb. 27, 1964, Ser. No. 347,693
19 Claims. (Cl. 260—295.5)

This invention relates to 1,5-naphthyridine and 1,6-naphthyridine derivatives, and their preparation.

The invention in its composition aspect is described as residing in the concept of a 1,4-dihydro-1,5-naphthyridine-3-carboxylic acid or 1,4-dihydro-1,6-naphthyridine-3-carboxylic acid substituted in the 4-position by oxo and in the 1-position by lower-alkyl.

Illustrative and preferred embodiments of my compounds are those of Formulas I and IA

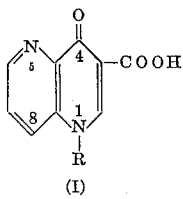 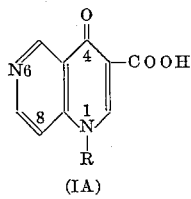

(I)　　　　　　　　(IA)

where R is a lower-alkyl. The 1,5-naphthyridine or 1,6-naphthyridine nucleus can bear substituents respectively at positions 6, 7 and 8 or at positions 5, 7 and 8. Said substituents are illustrated by, but not limited to lower-alkyl, lower-alkoxy, hydroxy, halo, lower-alkylamino, lower-alkylmercapto, and the like. Also, inert substituents, e.g., lower-alkyl, can be present at position 2 of each ring. The term "lower-alkyl," as used herein, e.g., for R in Formula I or IA or in the substituent of the 1,5-naphthyridine or 1,6-naphthyridine ring of Formula I or IA, means lower-alkyl radicals having preferably from one to six carbon atoms which can be arranged as straight or branched chains, and are illustrated by methyl, ethyl, n-propyl, isopropyl, 2-butyl, n-hexyl, and the like.

The term "halo," as used herein, e.g., as a substituent of the 1,5-naphthyridine or 1,6-naphthyridine ring, means chloro, bromo, iodo or fluoro.

The invention in its process aspect is described as residing in the concept of reacting a 4-hydroxy-1,5-naphthyridine-3-carboxylic acid or 4-hydroxy-1,6-naphthyridine-3-carboxylic acid or lower-alkyl ester thereof with a lower-alkyl ester of a strong acid, i.e., an acid which is practically completely dissociated in aqueous solution, said ester of the formula R—An where An is a strong inorganic acid or an organic sulfonic acid, e.g., chloride, bromide, iodide, sulfate, benzenesulfonate, para-toluenesulfonate, and the like, and R is lower-alkyl. The chloride, bromide, or iodide is preferred because of the more ready availability of the requisite lower-alkyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium bicarbonate, potassium bicarbonate, sodium alkoxides, potassium alkoxides, sodium amide, and the like. The purpose of the acid-acceptor is to take up the hydrogen halide (or HAn) which is split out during the course of the reaction. The reaction can be carried out either in the presence or absence of a suitable solvent, but preferably in a solvent such as a lower-alkanol, acetone, dioxane, dimethylformamide, methyl isobutyl ketone, dimethyl sulfoxide, or a mixture of such solvents, e.g., a mixture of water and a lower-alkanol. The reaction is generally carried out at a temperature between about room temperature (about 25° C.) and 150° C., preferably at reflux, in a lower-alkanol, or in dimethylformamide.

My process thus comprises reacting the corresponding 4-hydroxy-1,5-naphthyridine-3-carboxylic acid or 4-hydroxy-1,6-naphthyridine-3-carboxylic acid or esters thereof of the Formulas II and IIA

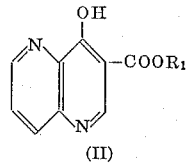 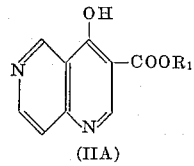

(II)　　　　　　　　(IIA)

where $R_1$ is hydrogen or lower-alkyl, with an ester having the formula R—An, where R is lower-alkyl and An is an anion of a strong inorganic acid or an organic sulfonic acid, preferably in the presence of an acid-acceptor.

When $R_1$ is hydrogen, i.e., when the intermediate is a 4-hydroxy-1,5-naphthyridine-3-carboxylic acid or a 4-hydroxy-1,6-naphthyridine-3-carboxylic acid, the reaction is conveniently carried out by refluxing the acid with a lower-alkyl ester, R—An, preferably the halide, in aqueous ethanol in the presence of potassium or sodium hydroxide to yield the corresponding 1,4-dihydro-4-oxo-1-R-1,5-naphthyridine-3-carboxylic acid or 1,4-dihydro-4-oxo-1-R-1,6-naphthyridine-3-carboxylic acid; the same 3-carboxylic acid is also obtained using these reaction conditions and a lower-alkyl 4-hydroxy-1,5-naphthyridine-3-carboxylate or lower-alkyl 4-hydroxy-1,6-naphthyridine-3-carboxylate as the intermediate, the ester hydrolyzing under the reaction conditions to form the acid. If the final product is desired in the form of its lower-alkyl ester, e.g., the ethyl ester, the intermediate ethyl 4-hydroxy-1,5-naphthyridine-3-carboxylate or ethyl 4-hydroxy-1,6-naphthyridine-3-carboxylate is reacted as above using a non-aqueous medium, for example, using refluxing ethanol as the solvent and sodium ethoxide as the acid-acceptor or using dimethlformamide as the solvent and anhydrous potassium carbonate as the acid-acceptor.

Some of the intermediate 4-hydroxy-1,5(or 1,6)naphthyridine-3-carboxylic acids or esters are known, e.g., 4-hydroxy-1,5-naphthyridine-3-carboxylic acid and its ethyl ester, 4-hydroxy-1,6-naphthyridine-3-carboxylic acid in its ethyl ester. Other such intermediates, where novel, are prepared by a generally known method which is illustrated in the examples hereinbelow. One of the novel compounds prepared for use in this method, namely, diethyl N-(2,6-dimethyl-4-pyridyl)aminomethylenemalonate, was tested for antibacterial properties by standard test procedures and unexpectedly found to have in vivo activity against Staphylococcus aureus in Swiss mice when administered subcutaneously at a dose level of 100 mg./kg./day. This compound thus is another aspect of the present invention.

Also within the scope of the invention are lower-alkyl esters and salts of my above-described 1,4-dihydro-4-oxo-1 - R - 1,5 - naphthyridine - 3 - carboxylic acids or 1,4 - dihydro - 4 - oxo - 1 - R - 1,6 - naphthyridine - 3 - carboxylic acids, said esters and preferred salts being fully equivalent with the acids as antibacterial agents and, further, said esters and all salts having further utility hereindisclosed. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts, e.g., diethanolamine or N-methylglucamine salts. Although therapeutically acceptable salts are preferred, other and all cationic salts are within the scope of my invention.

All such salts, including those having toxic cations, are useful in characterizing the free acids and is intermediates in purification of the free acids. The salts are prepared from the acids using conventional methods for converting acids into salts.

The molecular structures of the compounds of my invention are established by their mode of synthesis and confirmed by the correspondence of calculated and found valves for the elementary analyses of representative examples and by infrared, ultraviolet and NMR spectral anaylses.

Tangible physical embodiments of my 1,4-dihydro-4-oxo-1-R-1,5-naphthyridine-3-carboxylic acids or 1,4-dihydro-4-oxo-1-R-1,6-naphtyridine-3-carboxylic acids have been tested by standard biological evaluation procedures and found to have useful antibacterial properties, e.g., when tested according to standard in vitro bacteriological evaluation procedures they have been found to possess antibacterial activity, for example, against *Eberthella typhi* and *Clostridium welchii*, at test concentration levels in the range of about 0.10 to 1.0 mg./cc., as illustrated below in the examples. Preferred embodiments were found to have in vivo activity against Gram-negative bacteria, e.g., *Klebsiella pneumoniae*, in Swiss mice when administered subcutaneously at dose levels in the range of about 200 to 400 mg./kg./day. The embodiments of my invention can be administered by conventional means.

The following examples will further illustrate the invention, without, however, limiting it thereto.

*Example 1*

1,4 - dihydro - 1 - methyl - 4 - oxo - 1,5 - naphthyridine-3-carboxylic acid was prepared as follows: A mixture containing 11.0 g. of ethyl 4-hydroxy-1,5-naphthyridine-3-carboxylate, 10.5 g. of anhydrous potassium carbonate and 125 cc. of dimethylformamide was stirred on a steam bath until the naphthyridine dissolved. To this solution was added 5.0 cc. of methyl iodide and the resulting mixture was stirred on a steam bath for two hours. After standing at room temperature overnight, the reaction mixture was stirred and heated with decolorizing charcoal for one hour and then filtered. The filtrate was diluted with an equal volume of water and then evaporated to dryness in vacuo (about 15 mm.) on a steam bath. The resulting residual material, which contained ethyl 1,4-dihydro-1 - methyl - 4 - oxo - 1,5 - naphthyridine - 3 - carboxylate, was taken up in 175 cc. of 5% aqueous potassium hydroxide solution and heated on a steam bath with stirring for ninety minutes, the last fifteen minutes with decolorizing charcoal. The mixture was filtered and the filtrate evaporated to dryness on a steam bath. The residue was dissolved in a small quantity of water and within a few minutes a white solid separated. The solid was dissolved in a small quantity of hot water, the solution made acidic (pH of about 6.0) with acetic acid whereupon a solid separated. After the mixture had been cooled well in ice, the solid was collected, recrystallized from 1500 cc. of water using decolorizing charcoal, washed with acetone and air-dried to yield 4.3 g. (42% yield) of the product, 1,4 - dihydro - 1 methyl - 4 - oxo - 1,5 - naphthyridine - 3-carboxylic acid, M.P. 328–329° C. with decomposition.

*Anal.*—Calcd. for $C_{10}H_8N_2O_3$: C, 58.82; H, 3.95; N, 13.72. Found: C, 58.90; H, 4.17; N, 13.42.

1,4 - dihydro - 1 - methyl - 4 - oxo - 1,5 - naphthyridine-3-carboxylic acid when tested according to standard in vitro bacteriological evaluation procedures was found to have bacteriostatic activity at concentration of 0.1 mg./cc. against each of *Clostridium welchii* and *Eberthelli typhi*.

Ethyl 1,4-dihydro-1-methyl-4-oxo-1,5-naphthyridine-3-carboxylate is obtained by esterfication of the above acid or by working up the above residual material (containing said ethyl ester) prior to hydrolysis with aqueous potassium hydroxide, i.e., by recrystallizing the residual material with a suitable solvent, e.g., ethanol, preferably using decolorizing charcoal. Other lower-alkyl esters of 1,4-dihydro-1-methyl-4-oxo-1,5-naphthyridine-3-carboxylic acid, e.g., methyl, n-propyl, isobutyl or n-hexyl esters, are obtained by either of the above procedures, i.e., by esterification of the acid with the appropriate lower-alkanol or by reacting the appropriate lower-alkyl 4-hydroxy-1,5-naphthyridine-3-carboxylate with methyl iodide as in the above procedure and isolating the lower-alkyl ester instead of proceeding with the alkaline hydrolysis.

*Example 2*

1 - ethyl - 1,4 - dihydro - 4 - oxo - 1,5 - naphthyridine-3-carboxylic acid was prepared as follows: A mixture containing 11.0 g. of ethyl 4-hydroxy-1,5-naphthyridine-3-carboxylate, 10.5 g. of anhydrous potassium carbonate, 125 cc. of dimethylformamide and 6.5 cc. of ethyl iodide was heated with stirring on a steam bath for two and one half hours and then evaporated to dryness in vacuo by heating on a steam bath. The residual material containing ethyl 1 - ethyl - 1,4 - dihydro - 4 - oxo - 1,5 - naphthyridine-3-carboxylate was taken up in 170 cc. of 5% aqueous potassium hydroxide solution and heated on a steam bath with stirring for seventy-five minutes, the last fifteen minutes with decolorizing charcoal. The mixture was filtered and the filtrate made acidic (pH of 5.5) with acetic acid. When no product separated after chilling the solution in an ice bath, the solution was evaporated to dryness on a steam bath. The solid was dissolved in a small quantity of boiling water and the pH of the solution was adjusted to 5.5 with hydrochloric acid and acetic acid. The resulting solution when chilled in an ice bath yielded the crystalline product which was collected, recrystallized from a small amount of dimethylformamide, washed with acetone, and dried in a vacuum oven (80° C.) to yield 3.8 g. of 1 - ethyl - 1,4 - dihydro - 4 - oxo - 1,5-naphthyridine-3-carboxylic acid, M.P. 258.7–260.5° C. (corr.).

*Anal.*—Calcd. for $C_{11}H_{10}N_2O_3$: C, 60.54; H, 4.62; N, 12.84. Found: C, 60.43; H, 4.48; N, 12.65.

Following the above procedure and using n-propyl chloride, isobutyl para-toluenesulfonate or n-hexyl bromide in place of ethyl iodide, there are obtained, respectively, 1-n-propyl-1,4-dihydro-4-oxo-1,5-naphthyridine-3-carboxylic acid, 1 - isobutyl - 1,4-dihydro-4-oxo-1,5-naphthyridine - 3 - carboxylic acid or 1-n-hexyl-1,4-dihydro-4-oxo-1,5-naphthyridine-3-carboxylic acid.

*Example 3*

1,4 - dihydro - 1,6 - dimethyl-4-oxo-1,5-naphthyridine-3-carboxylic acid was prepared as follows: A mixture containing 17.3 g. of ethyl 4-hydroxy-6-methyl-1,5-naphthyridine-3-carboxylate, 14.1 g. of anhydrous potassium carbonate and 175 cc. of dimethylformamide was heated on a steam bath with stirring and to the hot suspension was added 7.0 cc. of methyl iodide whereupon the solid material of the mixture dissolved. The reaction mixture was heated with stirring for two and one half hours and then evaporated in vacuo to dryness on a steam bath. The residue containing ethyl 1,4-dihydro-1,6-dimethyl-4-oxo-1,5-naphthyridine-3-carboxylate was taken up in 170 cc. of 5% aqueous potassium hydroxide solution by heating with stirring for about two hours on a steam bath. The hot solution was treated with decolorizing charcoal and filtered. The filtrate was made acidic (pH of about 6.0) with acetic acid whereupon a solid separated. The mixture was cooled in an ice bath and the solid collected, washed with water and dried. The solid product was recrystallized from about 500 cc. of dimethylformamide using decolorizing charcoal, washed with acetone and dried at 70° C. to yield 9.1 g. of the product, 1,4-dihydro-1,6 - dimethyl - 4-oxo-1,5-naphthyridine-3-carboxylic acid, M.P. >300° C.

*Anal.*—Calcd. for $C_{11}H_{10}N_2O_3$: C, 60.54; H, 4.62; N, 12.84. Found: C, 60.75; H, 4.92; N, 12.85.

The intermediate ethyl 4 - hydroxy-6-methyl-1,5-naphthyridine-3-carboxylate was prepared as follows: To a stirred refluxing solution of 390 cc. of Dowtherm A (eutectic mixture of diphenyl and diphenyl ether) was added 26.1 g. of diethyl N-(6-methyl-3-pyridyl)aminomethylenemalonate. Refluxing was continued for fifteen minutes and the reaction solution was then allowed to cool to room temperature with continued stirring. The precipitate was collected, washed first with n-pentane and then with acetone, and air-dried to yield 21.0 g. (96.3% yield) of ethyl 4-hydroxy-6-methyl-1,5-naphthyridine-3-carboxylate. A sample recrystallized from dimethylformamide, using decolorizing charcoal, melted at 277.2–278.0° C. (corr.) with decomposition. Hydrolysis of this ester by heating with aqueous potassium hydroxide solution yielded the corresponding 4-hydroxy-6-methyl-1,5-naphthyridine-3-carboxylic acid, M.P. >300° C.

Diethyl N-(6-methyl-3-pyridyl)aminomethylenemalonate was prepared as follows: A mixture of 10.8 g. of 3-amino-6-methylpyridine and 21.6 g. of diethyl ethoxymethylenemalonate was heated on a steam bath under reduced pressure (about fifteen minutes) for two hours. The ethanol formed by the reaction was distilled off, the resulting liquid reaction mixture was cooled, 100 cc. of isopropyl ether was added, the mixture heated to boiling and filtered, and the filtrate allowed to cool to room temperature whereupon the product separated. The crystalline precipitate was collected and air-dried to yield 23.4 g. (84%) of diethyl N-(6-methyl-3-pyridyl)aminomethylenemalonate, M.P. 88–89° C.

1,4 - dihydro - 1,6-dimethyl-4-oxo-1,5-naphthyridine-3-carboxylic acid is obtained directly by refluxing 4-hydroxy-6-methyl-1,5-naphthyridine-3-carboxylic acid with methyl iodine in aqueous ethanol using potassium hydroxide as the acid-acceptor. The 4-hydroxy-6-methyl-1,5-naphthyridine-3-carboxylic acid is obtained by conventional hydrolysis of the corresponding ester.

*Example 4*

1 - ethyl - 1,4 - dihydro-6-methyl-4-oxo-1,5-naphthyridine-3-carboxylic acid was prepared as follows: A mixture containing 28.7 g. of ethyl 4-hydroxy-6-methyl-1,5-naphthyridine-3-carboxylate, 25.6 g. of anhydrous potassium carbonate and 300 cc. of dimethylformamide was stirred and heated on a steam bath. To the hot mixture was added 16.5 cc. of ethyl iodide whereupon dissolution resulted after a few minutes. The reaction mixture was heated on the steam bath for three hours and evaporated to dryness in vacuo by heating on the steam bath; the resulting residue containing ethyl 1 - ethyl - 1,4-dihydro-6-methyl - 4-oxo-1,5-naphthyridine-3-carboxylate was taken up in 300 cc. of 5% aqueous potassium hydroxide solution and heated for three and one half hours, the last thirty minutes with decolorizing charcoal. The hot mixture was filtered and the filtrate acidified to a pH of 6.2 using acetic acid whereupon the product separated. The mixture was cooled well in ice; the precipitate was collected, washed with water, and taken up in dilute aqueous potassium hydroxide solution. The alkaline solution was acidified to a pH of about 6 with acetic acid and cooled in an ice bath. The resulting precipitate was collected, washed with a little water and recrystallized successively from water (about 200 cc.), acetonitrile (using decolorizing charcoal) and finally dimethylformamide. The product was then washed with ether and dried overnight in a vacuum oven (80° C.) to yield 5.3 g. of 1-ethyl-1,4-dihydro - 6 - methyl - 4-oxo-1,5-naphthyridine-3-carboxylic acid, M.P. 244.5–246.5° C. (corr.).

*Anal.*—Calcd. for $C_{12}H_{12}N_2O_3$: C, 62.06; H, 5.21; N, 12.06. Found: C, 61.78; H, 5.20; N, 11.80.

Sodium 1 - ethyl-1,4-dihydro-6-methyl-4-oxo-1,5-naphthyridine - 3 - carboxylate is obtained by warming on a steam bath a mixture of 6.9 g. of 1-ethyl-1,4-dihydro-6-methyl-4-oxo-1,5-naphthyridine-3-carboxylic acid, 1.1 g. of sodium hydroxide and 150 cc. of ethanol until dissolution results. The warm solution is filtered, the filtrate allowed to cool, and the solid collected and air-dried to yield said sodium salt.

Cupric di(1-ethyl-1,4-dihydro-6-methyl-4-oxo-1,5-naphthyridine-3-carboxylate) is obtained as follows: To a solution containing 11.6 g. of 1-ethyl-1,4-dihydro-6-methyl-4-oxo-1,5-naphthyridine-3-carboxylic acid and 3.0 g. of sodium methoxide dissolved in 400 cc. of hot methanol is added with stirring a solution containing 5.0 g. of cupric acetate monohydrate in 300 cc. of hot methanol. The reaction mixture is stirred at room temperature for about two hours and the precipitated cupric salt is collected and dried in vacuo at 70° C.

Other metal salts, e.g., the calcium salts, and amine salts, e.g., the N-methylglucamine salt, be obtained as above. All of these salts are useful not only an antibacterial agents but also in characterizing the free acids and as intermediates in the purification of the free acids, e.g., the unrecrystallized acid of the above example can be converted to the salt as above and then reconverted by conventional means to the acid.

*Example 5*

1,4 - dihydro - 1-methyl-4-oxo-1,6-naphthyridine-3-carboxylic acid was prepared as follows: To a mixture containing 8.0 g. of ethyl 4-hydroxy-1,6-naphthyridine-3-carboxylate, 5.1 g. of anhydrous potassium carbonate and 80 cc. of dimethylformamide heated on a steam bath with stirring was added 2.3 cc. of methyl iodide and heating was continued for two and one half hours. The reaction mixture was then evaporated in vacuo (about 15 mm.) to dryness on the steam bath. The residue containing ethyl 1,4-dihydro-1-methyl-4-oxo-1,6-naphthyridine-3-carboxylate was taken up in 80 cc. of 5% aqueous potassium hydroxide solution and heated on a steam bath with stirring for seventy-five minutes, the last fifteen minutes with decolorizing charcoal. The mixture was filtered and the filtrate acidified to pH 4.5 with hydrochloric acid whereupon a solid separated. The mixture was chilled in ice, and the solid was collected, washed with water and dried in a vacuum oven to yield 5.8 g. of 1,4-dihydro-1-methyl-4-oxo-1,6-naphthyridine-3-carboxylic acid, M.P. 260–262° C. with decomposition. The product was recrystallized from about 150 cc. of dimethylformamide using decolorizing charcoal, washed with acetone and dried in a vacuum oven and found to melt at 262–263° C. with decomposition (corrected M.P. 258.8–259.0° C. with decomposition).

*Anal.*—Calcd. for $C_{10}H_8N_2O_3$: C, 58.82; H, 3.95; N, 13.72. Found: C, 58.86; H, 4.06; N, 13.75.

Ethyl 1,4-dihydro-1-methyl-4-oxo-1,6-naphthyridine-3-carboxylate is obtained by esterification of the above acid or by working up the above residual material (containing said ethyl ester) prior to hydrolysis with aqueous potassium hydroxide, i.e., by recrystallizing the residual material with a suitable solvent, e.g., ethanol, preferably using decolorizing charcoal. Other lower-alkyl esters of 1,4-dihydro-1-methyl-4-oxo-1,6-naphthyridine-3-carboxylic acid, e.g., the methyl, n-propyl, isobutyl or n-hexyl esters, are obtained by either of the above procedures, i.e., by esterification of the acid with the appropriate lower-alkanol or by reacting the appropriate lower-alkyl 4-hydroxy-1,6-naphthyridine-3-carboxylate with methyl iodide as in the above procedure and isolating the lower-alkyl ester instead of proceeding with the alkaline hydrolysis.

*Example 6*

1 - ethyl - 1,4 - dihydro-4-oxo-1,61-naphthyridine-3-carboxylic acid was prepared following the procedure described in Example 5 using 14.0 g. of ethyl 4-hydroxy-1,6-naphthyridine-3-carboxylate, 8.9 g. of anhydrous potassium carbonate, 140 cc. of dimethylformamide and 5.2 cc. of ethyl iodide. There was thus obtained 6.1 g. (44%) of the product, 1-ethyl-1,4-dihydro-4-oxo-1,6-naphthyridine-3-carboxylic acid, M.P. 258.6–262.0° C. (corr.) with decomposition, after recrystallization from dimethylformamide using decolorizing charcoal.

*Anal.*—Calcd. for $C_{11}H_{10}N_2O_3$: C, 60.54; H, 4.62; N, 12.84. Found: C, 60.41; H, 4.61; N, 12.78.

Following the above procedure and using n-butyl chloride, isobutyl para-toluenesulfonate or n-hexy bromide in place of ethyl iodide, there are obtained, respectively, 1-n-butyl - 1,4 - dihydro-4-oxo-1,6-naphthyridine-3-carboxylic acid, 1 - isobutyl - 1,4-dihydro-4-oxo-1,6-naphthyridine-3-carboxylic acid or 1-n-hexyl-1,4-dihydro-4-oxo-1,6-naphthyridine-3-carboxylic acid.

Example 7

1,4 - dihydro-4-oxo-1-n-propyl-1,6-naphthyridine-3-carboxylic acid was prepared following the procedure described in Example 5 using 23.3 g. of ethyl 4-hydroxy-1,6-naphthyridine-3-carboxylate, 22.2 g. of anhydrous potassium carbonate, 250 cc. of dimethylformamide and 17.4 g. of n-propyl iodide. There are thus obtained 5.0 g. of 1,4 - dihydro - 4-oxo-1-n-propyl-1,6-naphthyridine-3-carboxylic acid, M.P. 230.0–232.0° C. (corr.), after one recrystallization from acetonitrile.

*Anal.*—Calcd. for $C_{12}H_{12}N_2O_3$: C, 62.06; H, 5.21; N, 12.06. Found: C, 62.37; H, 5.26; N, 11.87.

Example 8

1,4-dihydro - 1,5,7 - trimethyl-4-oxo-1,6-naphthyridine-3-carboxylic acid was prepared as follows: A mixture containing 6.4 g. of ethyl 4-hydroxy-5,7-dimethyl-1,6-naphthyridine-3-carboxylate, 3.6 g. of anhydrous potassium carbonate and 128 cc. of dimethylformamide was heated on a steam bath with stirring until a solution was obtained. To the solution was added 1.63 cc. of methyl iodide and the reaction mixture was heated on the steam bath with stirring for two hours and then allowed to stand overnight at room temperature. The reaction mixture was evaporated in vacuo to dryness on the steam bath and the residue containing ethyl 1,4-dihydro-1,5,7-dimethyl-4-oxo-1,6-naphthyridine-3-carboxylate was taken up in 64 cc. of 5% aqueous potassium hydroxide solution. The resulting solution was heated on a steam bath with stirring for about two hours, the last fifteen minutes with decolorizing charcoal. The mixture was filtered and the filtrate was diluted with water, and then, acidified to a pH of 5.5 with 6 N hydrochloric acid. The resulting precipitate was collected, washed with water and recrystallized from dimethylformamide, using decolorizing charcoal, to yield 4.4 g. of 1,4-dihydro-1,5,7-trimethyl-4-oxo-1,6-naphthyridine-3-carboxylic acid, M.P. 302° C. with decomposition, after washing with ether and drying in a vacuum oven.

*Anal.*—Calcd. for $C_{12}H_{12}N_2O_3$: C, 62.06; H, 5.21; N, 12.06. Found: C, 62.03; H, 5.25; N, 12.11.

1,4-dihydro - 1,5,7 - trimethyl-4-oxo-1,6-naphthyridine-3-carboxylic acid was found to have in vivo activity against *Klebsiella pneumoniae* in mice when administered subcutaneously at 200 mg./kg./day (7 out of 10 mice survived).

The intermediate ethyl 4-hydroxy-5,7-dimethyl-1,6-naphthyridine-3-carboxylate was prepared as follows: A solution containing 19.1 g. of diethyl N-(2,6-dimethyl-4-pyridyl)aminomethylenemalonate and 190 cc. of Dowtherm A was refluxed with stirring for four minutes; the reaction mixture was cooled to room temperature; and, the resulting precipitate was collected, washed with ether and dried to yield 14.9 g. (93%) of ethyl 4-hydroxy-5,7-dimethyl-1,6-naphthyridine-3-carboxylate, M.P. 317–318° C. with decomposition. A sample recrystallized from dimethylformamide using decolorizing charcoal, washed with ether and dried overnight in a vacuum oven melted at 324° C. with decomposition and analyzed as follows:

*Anal.*—Calcd. for $C_{13}H_{14}N_2O_3$: C, 63.40; H, 5.73; N, 11.38. Found: C, 63.43; H, 5.79; N, 11.34.

Diethyl N - (2,6 - dimethyl-4-pyridyl)aminomethylenemalonate was prepared as follows: A mixture containing 22.0 g. of 4-amino-2,6-dimethylpyridine, 39.0 g. of diethyl ethoxymethylenemalonate and 55 cc. of absolute ethanol was heated on a steam bath under reduced pressure (about 15 mm.) for two hours. The reaction mixture was allowed to cool and the separated solid was collected and recrystallized from isopropyl ether to yield 23.6 g. of diethyl N - (2,6-dimethyl-4-pyridyl)aminomethylenemalonate, M.P. 91.4–92.8° C. (corr.).

*Anal.*—Calcd. for $C_{15}H_{20}N_2O_4$: C, 61.63; H, 6.90; N, 9.58. Found: C, 61.92; H, 6.62; N, 9.75.

Diethyl N - (2,6-dimethyl-4-pyridyl)aminomethylenemalonate was found to have in vivo activity against *Staphylococcus aureus* in mice when administered subcutaneously at a dose level of 100 mg./kg./day (6 out of 10 mice survived).

Example 9

1 - ethyl - 1,4 - dihydro-5,7-dimethyl-4-oxo-1,6-naphthyridine-3-carboxylic acid was prepared as follows: A mixture containing 8.5 g. of ethyl 4-hydroxy-5,7-dimethyl-1,6-naphthyridine-3-carboxylate, 4.8 g. of anhydrous potassium carbonate, 170 cc. of dimethylformamide was heated on a steam bath with stirring until a solution was obtained. To the solution was added 5.4 g. of ethyl iodide and heating on the steam bath with stirring was continued for three hours. The reaction mixture was allowed to stand overnight at room temperature and was then evaporated in vacuo to dryness by heatings on a steam bath. The residue, which contained ethyl 1-ethyl-1,4-dihydro-5,7-dimethyl-4-oxo-1,6-naphthyridine-3-carboxylate, was taken up in 85 cc. of 5% aqueous potassium hydroxide solution; the solution was heated on a steam bath with stirring for three hours; charcoal was added to the solution; and, the mixture was stirred an additional fifteen minutes and filtered. The filtrate was diluted with water and acidified to a pH of 4.0 with hydrochloric acid whereupon the product separated. The mixture was cooled in an ice bath and the solid was separated, washed with water, air-dried and recrystallized from dimethylformamide using decolorizing charcoal to yield 5.9 g. of 1-ethyl-1,4-dihydro-5,7 - dimethyl-4-oxo-1,6-naphthyridine-3-carboxylic acid, M.P. 246.5–247.0° C. (corr.) with decomposition, after washing with ether and drying in a vacuum oven.

*Anal.*—Calcd. for $C_{13}H_{14}N_2O_3$: C, 63.40; H, 5.73; N, 11.38. Found: C, 63.36; H, 5.73; N, 11.55.

Example 10

1,4 - dihydro - 1,5-dimethyl-4-oxo-1,6-naphthyridine-3-carboxylic acid and 1,4-dihydro-1,7-dimethyl-4-oxo-1,6-naphthyridine-3-carboxylic acid were obtained as a mixture in a ratio of 72% to 28% as follows: A mixture containing 8.4 g. of a 2 to 1 mixture (see below) of ethyl 4-hydroxy-5-methyl-1,6-naphthyridine-3-carboxylate and ethyl 4-hydroxy-7-methyl-1,6-naphthyridine-3-carboxylate, 5.0 g. of anhydrous potassium carbonate, 165 cc. of dimethylformamide and 2.3 cc. of methyl iodide was heated with stirring on a steam bath for two hours and then allowed to stand overnight at room temperature. The reaction mixture was evaporated in vacuo to dryness on a steam bath and the residue containing a mixture of the ethyl esters of the two products was taken up in 170 cc. of 5% aqueous potassium hydroxide; the solution was heated on a steam bath with stirring for two hours; decolorizing charcoal was added; and, the resulting mixture was stirred an additional thirty minutes and then filtered. The filtrate was acidified to a pH of 5 with concentrated hydrochloric acid and the solid that separated was collected, washed with acetone and air-dried to yield 6.2 g. of the product, M.P. 250° C. with decomposition. This material was combined with 1.4 g. of the same product obtained as above and recrystallized from dimethylformamide using decolorizing charcoal, washed with acetone and dried in a vacuum oven at 80° C. for twenty-four hours to yield 5.4 g. of a mixture of 1,4-dihydro-1,5-dimethyl-4-oxo-1,6-naphthyridine-3-carboxylic acid and 1,4-dihydro-1,7-dimethyl-4-oxo-1,6-naphthyridine-3-carboxylic acid in a ratio of 78% to 28%, M.P. 253.5–258.0° C. (corr.) with decomposition. The ratio of the two isomers was determined by nuclear magnetic resonance studies.

Anal.—Calcd. for $C_{11}H_{10}N_2O_3$: C, 60.54; H, 4.62; N, 12.84. Found: C, 60.75; H, 4.72; N, 12.80.

The intermediates, ethyl 4-hydroxy-5-methyl-1,6-naphthyridine-3-carboxylate and ethyl 4-hydroxy-7-methyl-1,6-naphthyridine-3-carboxylate, were prepared as a mixture as follows: A mixture containing 48.1 g. of diethyl N-(2-methyl-4-pyridyl)aminomethylenemalonate and 480 cc. of Dowtherm A was refluxed with stirring for about five minutes after taking about thirty minutes to bring the temperature to reflux. The reaction mixture was allowed to cool to room temperature with stirring and the solid that separated was collected, washed with ether and air-dried to yield 21.3 g. of the product, M.P. 283–284° C. with decomposition. An 8 g. portion of the product was recrystallized from dimethylformamide using decolorizing charcoal, washed with acetone and dried overnight in a vacuum oven at 50° C. to yield 5.2 g. of a 67:33 ratio of ethyl 4-hydroxy-5-methyl-1,6-naphthyridine-3-carboxylate and ethyl 4-hydroxy-7-methyl-1,6-naphthyridine-3-carboxylate, M.P. 289.6–290.2° C. (corr.) with decomposition. The ratio of the two isomers was determined by nuclear magnetic resonance studies.

Anal.—Calcd. for $C_{12}H_{12}N_2O_3$: $N_K$, 12.06; $N_{AP}$, 6.03. Found: $N_K$, 11.95; $N_{AP}$, 5.78.

$N_K$=total nitrogen determined by the Kjeldahl method.
$N_{AP}$=titration of basic nitrogen (i.e., 6-N) with perchloric acid in acetic acid.

Diethyl N-(2-methyl-4-pyridyl)aminomethylenemalonate was prepared as follows: A mixture containing 20.3 g. of 4-amino-2-methylpyridine and 40.6 g. of diethyl ethoxymethylenemalonate was heated on a steam bath under reduced pressure (about 15 mm.) for fifteen hours. The liquid residue containing diethyl N-(2-methyl-4-pyridyl)aminomethylenemalonate was used directly in the above reaction without purification.

Example 11

1-ethyl-1,4-dihydro-7-methyl-4-oxo-1,6-naphthyridine-3-carboxylic acid was prepared as follows: A mixture containing 13.3 g. of a 2 to 1 ratio of ethyl 4-hydroxy-5-methyl-1,6-naphthyridine-3-carboxylate and ethyl 4-hydroxy-7-methyl-1,6-naphthyridine-3-carboxylate, 8.0 g. of anhydrous potassium carbonate and 260 cc. of dimethylformamide was heated on a steam bath with stirring; 4.7 cc. of ethyl iodide was added; the mixture was heated with stirring on the steam bath for two hours and evaporated in vacuo to dryness by heating on the steam bath. The residue containing the ethyl ester of the product was taken up in 260 cc. of 5% aqueous potassium hydroxide and heated on a steam bath for two hours with stirring, the last fifteen minutes with decolorizing charcoal. The mixture was filtered and the filtrate acidified to a pH of 4.0 with acetic acid. The solid that separated was collected, washed with water, air-dried and recrystallized from dimethylformamide using decolorizing charcoal to yield 2.7 g. of 1-ethyl-1,4-dihydro-7-methyl-4-oxo-1,6-naphthyridine-3-carboxylic acid, M.P. 248.2–250.0° C. (corr.) with decomposition, after washing with acetone and drying in a vacuum oven at 50° C. for eighteen hours. According to nuclear magnetic resonance studies, the recrystallized product contained only the 7-methyl isomer.

Anal.—Calcd. for $C_{12}H_{12}N_2O_3$: C, 62.06; H, 5.21; $N_K$, 12.06; $N_{AP}$, 6.03. Found: C, 62.00; H, 5.11; $N_K$, 11.74; $N_{AP}$, 5.65.

Sodium 1-ethyl-1,4-dihydro-7-methyl-4-oxo-1,6-naphthyridine-3-carboxylate is obtained by warming on a steam bath a mixture of 6.9 g. of 1-ethyl-1,4-dihydro-7-methyl-4-oxo-1,6-naphthyridine-3-carboxylic acid, 1.1. g. of sodium hydroxide and 150 cc. of ethanol until dissolution results. The warm solution is filtered, the filtrate allowed to cool, and the solid collected and air-dried to yield said sodium salt.

Cupric di(1-ethyl-1,4-dihydro-7-methyl-4-oxo-1,6-naphthyridine-3-carboxylate) is obtained as follows: To a solution containing 11.6 g. of 1-ethyl-1,4-dihydro-7-methyl-4-oxo-1,6-naphthyridine-3-carboxylic acid and 3.0 g. of sodium methoxide dissolved in 400 cc. of hot methanol is added with stirring a solution containing 5.0 g. of cupric acetate monohydrate in 300 cc. of hot methanol. The reaction mixture is stirred at room temperature for about two hours and the precipitated cupric salt is collected and dried in vacuo at 70° C.

Other metal salts, e.g., the calcium salt, and amine salts, e.g., the N-methylglucamine salt, can be obtained as above. All of these salts are useful not only as antibacterial agents but also in characterizing the free acids and as intermediates in the purification of the free acids, e.g., the unrecrystallized acid can be converted to the salt as above and then reconverted by conventional means to the acid.

I claim:
1. A compound of the formula

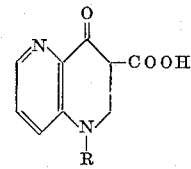

where R is lower-alkyl.

2. 1,4-dihydro-1-methyl-4-oxo-1,5-naphthyridine-3-carboxylic acid.
3. 1-ethyl-1,4-dihydro-4-oxo-1,5-naphthyridine-3-carboxylic acid.
4. 1,4-dihydro-1,6-dimethyl-4-oxo-1,5-naphthyridine-3-carboxylic acid.
5. 1-ethyl-1,4-dihydro-6-methyl-4-oxo-1,5-naphthyridine-3-carboxylic acid.
6. A process for the preparation of a compound of the formula

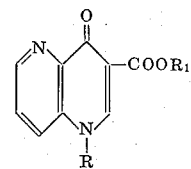

where $R_1$ is a member selected from the group consisting of hydrogen and lower-alkyl, and R is lower-alkyl, which comprises reacting the corresponding 3-$COOR_1$-4-hydroxy-1,5-naphthyridine of the formula

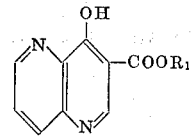

with a lower-alkyl ester of the formula R—An where R is lower-alkyl and An is an anion selected from the group consisting of a strong inorganic acid and an organic sulfonic acid in the presence of an acid-acceptor.

7. A process for the preparation of a compound of the formula

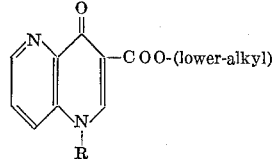

where R is lower-alkyl, which comprises reacting the corresponding lower-alkyl 4-hydroxy-1,5-naphthyridine-3-carboxylate with a lower-alkyl halide.

8. A process for the preparation of a compound of the formula

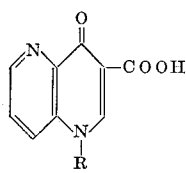

where R is lower-alkyl, which comprises the steps of reacting the corresponding lower-alkyl 4-hydroxy-1,5-naphthyridine-3-carboxylate with a lower-alkyl halide to obtain the lower-alkyl 1,4-dihydro-4-oxo-1,5-naphthyridine-3-carboxylate produced by the process of claim 7 and hydrolyzing this lower-alkyl ester to produce the corresponding acid of the above formula.

9. A compound of the formula

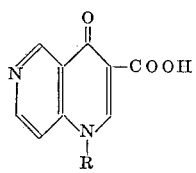

where R is lower-alkyl.

10. 1,4-dihydro-1-methyl-4-oxo-1,6-naphthyridine-3-carboxylic acid.

11. 1-ethyl-1,4-dihydro-4-oxo - 1,6 - naphthyridine-3-carboxylic acid.

12. 1,4-dihydro-4-oxo-1-n-propyl - 1,6 - naphthyridine-3-carboxylic acid.

13. 1,4-dihydro - 1,5,7, - trimethyl-4-oxo-1,6-naphthyridine-3-carboxylic acid.

14. 1-ethyl-1,4-dihydro - 5,7 - dimethyl-4-oxo-1,6-naphthyridine-3-carboxylic acid.

15. 1-ethyl - 1,4 - dihydro-7-methyl-4-oxo - 1,6 - naphthyridine-3-carboxylic acid.

16. A process for the preparation of a compound of the formula

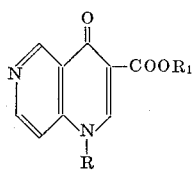

where $R_1$ is a member selected from the group consisting of hydrogen and lower-alkyl, and R is lower-alkyl, which comprises reacting the corresponding 3-$COOR_1$-4-hydroxy-1,6-naphthyridine of the formula

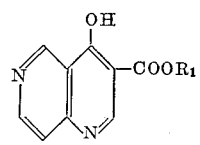

with a lower-alkyl ester of the formula R—An where R is lower-alkyl and An is an anion selected from the group consisting of a strong inorganic acid and an organic sulfonic acid in the presence of an acid-acceptor.

17. A process for the preparation of a compound of the formula

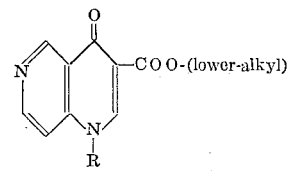

where R is lower-alkyl, which comprises reacting the corresponding lower-alkyl 4-hydroxy-1,6-naphthyridine-3-carboxylate with a lower-alkyl halide.

18. A process for the preparation of a compound of the formula

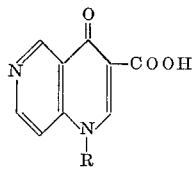

where R is lower-alkyl, which comprises the steps of reacting the corresponding lower-alkyl 4-hydroxy-1,6-naphthyridine-3-carboxylate with a lower-alkyl halide to obtain the lower-alkyl 1,4-dihydro-4-oxo-1,6-naphthyridine-3-carboxylate produced by the process of claim 17 and hydrolyzing this lower-alkyl ester to produce the corresponding acid of the above formula.

19. Diethyl N-(2,6 - dimethyl-4-pyridyl)aminomethylenemalonate.

References Cited by the Examiner
UNITED STATES PATENTS
3,149,104   9/1964   Lesher et al. _____ 260—240

OTHER REFERENCES

Klingsberg: "Pyridine and Derivatives, Part Three," Heterocyclic Compounds, Interscience, 1962, pp. 43 and 216.

WALTER A. MODANCE, *Primary Examiner.*

UNITED STATES PATENT OFFICE
CERTIFICATE OF CORRECTION

Patent No. 3,225,055                          December 21, 1965

George Yohe Lesher

It is hereby certified that error appears in the above numbered patent requiring correction and that the said Letters Patent should read as corrected below.

In the heading to the printed specification, line 2, for "-NAPTHYRIDINE-" read -- -NAPHTHYRIDINE- --; column 1, line 28, strike out "a"; column 2, line 40, for "dimethlformamide" read -- dimethylformamide --; line 46, for "in" read -- and --; column 3, line 14, for "-naphtyridine-" read -- -naphthyridine- --; column 4, line 29, for "5.5" read -- 5.0 --; column 5, line 32, for "iodine" read -- iodide --; column 6, line 68, for "-1,61-" read -- -1,6- --; column 7, line 6, for "n-hexy" read -- n-hexyl --; column 8, line 27, for "heatings" read -- heating --; column 9, line 73, for "1.1. g." read -- 1.1 g. --; column 10, lines 23 to 29, the formula should appear as shown below instead of as in the patent:

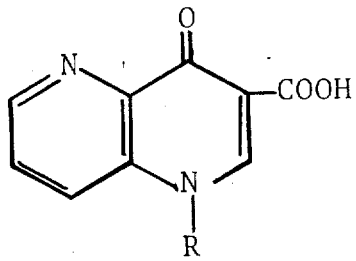

column 11, line 36, for "-1,5,7,-" read ---1,5,7- --.

Signed and sealed this 10th day of January 1967

(SEAL)
Attest:

ERNEST W. SWIDER                            EDWARD J. BRENNER
Attesting Officer                            Commissioner of Patents